United States Patent
Dyck

(10) Patent No.: US 11,364,835 B2
(45) Date of Patent: Jun. 21, 2022

(54) LIFTER APPARATUS FOR INDUSTRIAL AND AGRICULTURAL SPOOLS

(71) Applicant: Peter E Dyck, Seminole, TX (US)

(72) Inventor: Peter E Dyck, Seminole, TX (US)

(73) Assignee: Peter E. Dyck, Seminole, TX (US)

( * ) Notice: Subject to any disclaimer, the term of this patent is extended or adjusted under 35 U.S.C. 154(b) by 0 days.

(21) Appl. No.: 16/556,799

(22) Filed: Aug. 30, 2019

(65) Prior Publication Data
US 2021/0061155 A1 Mar. 4, 2021

(51) Int. Cl.
*B60P 1/48* (2006.01)
*B60S 9/12* (2006.01)

(52) U.S. Cl.
CPC .. *B60P 1/48* (2013.01); *B60S 9/12* (2013.01)

(58) Field of Classification Search
CPC ..................................... B60P 1/48; B60S 9/12
See application file for complete search history.

(56) References Cited

U.S. PATENT DOCUMENTS

| | | | | |
|---|---|---|---|---|
| 2,512,324 A * | 6/1950 | Hall | ...................... | B65H 75/362 254/134.3 FT |
| 3,743,205 A * | 7/1973 | Misrach | .................. | B65H 16/08 242/595.1 |
| 3,820,673 A * | 6/1974 | McVaugh | ................ | B60P 3/035 414/546 |
| 4,047,629 A * | 9/1977 | Klein | .................... | B62D 43/002 414/463 |
| 4,049,143 A * | 9/1977 | Hatakka | ..................... | B60P 1/34 414/458 |
| 4,091,946 A * | 5/1978 | Kraeft | ......................... | B60P 1/48 414/501 |
| 4,155,518 A * | 5/1979 | Small | ....................... | B60P 3/035 242/388.7 |
| 4,362,456 A * | 12/1982 | Barry | .................... | B65G 63/025 414/334 |
| 4,804,152 A * | 2/1989 | Masuda | .................. | B65H 18/10 242/540 |
| 5,582,501 A * | 12/1996 | Meyer | ..................... | B66F 9/082 414/491 |
| 5,904,218 A * | 5/1999 | Watkins | .................. | B62D 61/02 180/209 |
| 6,015,105 A * | 1/2000 | Brewer | .................... | B29B 17/02 241/30 |
| 7,153,082 B2* | 12/2006 | Nolasco | ................... | B60P 3/125 414/563 |
| 10,301,149 B2* | 5/2019 | Franklin-Hensler | ......................... | B65H 75/4442 |
| 10,745,237 B2* | 8/2020 | Russell | ................... | B65H 75/24 |
| 2006/0119080 A1* | 6/2006 | Damron | ..................... | B60S 9/12 280/656 |

(Continued)

*Primary Examiner* — Saul Rodriguez
*Assistant Examiner* — Ashley K Romano
(74) *Attorney, Agent, or Firm* — Michael Best & Friedrich LLP

(57) ABSTRACT

An apparatus is mountable on a truck or trailer bed for lifting industrial or agricultural spools for transport. The apparatus includes a pair of vertically pivotable lifting members, each one of the pair of lifting members having a distal end. A pair of lifting pins are mounted to a distal end of a corresponding lifting member. A drive system is operably connected to the pair of vertically pivotable lifting members whereby the pair of lifting pins engage a hole of a spool and the spool is lifted with the vertically pivotable lifting members by a drive system.

20 Claims, 4 Drawing Sheets

(56) References Cited

U.S. PATENT DOCUMENTS

| | | | |
|---|---|---|---|
| 2007/0017882 A1* | 1/2007 | Lewis | B62H 3/08 |
| | | | 211/20 |
| 2009/0196723 A1* | 8/2009 | Smith | B65H 49/38 |
| | | | 414/546 |
| 2015/0158692 A1* | 6/2015 | Reynolds | B60P 1/483 |
| | | | 242/390.2 |
| 2015/0291076 A1* | 10/2015 | Keast | B60P 3/035 |
| | | | 242/557 |
| 2017/0273246 A1* | 9/2017 | Fay, II | B60P 1/486 |
| 2018/0015865 A1* | 1/2018 | Varonier | B65H 75/4457 |
| 2018/0170706 A1* | 6/2018 | Grabowski | B65H 49/36 |
| 2019/0054815 A1* | 2/2019 | Gurski | B60K 6/00 |

* cited by examiner

LIFTER APPARATUS FOR INDUSTRIAL AND AGRICULTURAL SPOOLS

TECHNICAL FIELD

This disclosure relates generally to industrial and agricultural tool rigs and more particularly to an apparatus and method for lifting and securing an industrial or agricultural spool onto the bed of a trailer.

BACKGROUND

Agricultural spools are large spools used to deploy and pull irrigation poly pipe. Industrial spools are similar but are used in the context of industrial fluids such as production effluent, for example, rather than agricultural fluids. Spools are transported to an operations site in a trailer pulled by a truck or directly in the bed of a truck.

Lifting a spool and securing it onto the bed of a trailer is a dangerous undertaking. The present invention provides an apparatus of lifting arms, and methods, for safely lifting a spool onto the bed of a trailer and securing it there for transport and also for delivering a spool to a worksite and deploying the spool out of the trailer bed. With prior styles of arms, an operator stabs a 200 pound, or heavier, shaft into the cable spool. Then backs up to it with the trailer and loads it onto the arm. With the present system it is not necessary to lift the 200+ lb shaft and stab it onto the cable spool. The present apparatus thereby prevents or reduces the likelihood of worker worksite injury.

SUMMARY

The apparatus is mounted to the trailer on a pivoting arm that is lowered to attach to a cable spool (sometimes referred to in the industry as a "reel"). It includes a hydraulic cylinder connected to a pivoting plate that is connected to a pointed pin with bearings on it. The pin slides in a bushing. When the arm is lowered the cylinder will pull the pin out. Then the trailer is backed up to the cable spool until the pin is aligned centered on the cable spool.

The cable spool has a hole in the center with an opening on each end of the center hole. Once the lifting pin is lined up with the hole the cylinder pushes the lifting pin into the hole in the cable spool. The cable spool rides on the bearings of the pin. This operation is performed on both sides of the cable spool. Once both pins are in the cable spool the safety pin is put in. Then the arm can be raised back onto the trailer.

The present invention provides an apparatus mountable on a truck or trailer bed for lifting industrial or agricultural spools for transport. A specific exemplary embodiment of the apparatus includes a pair of vertically pivotable lifting members, each one of the pair of lifting members having a distal end. A pair of lifting pins, each one of the pair of lifting pins are mounted to a distal end of a corresponding lifting member. A drive system is operably connected to the pair of vertically pivotable lifting members whereby the pair of lifting pins engage a hole of a spool and the spool is lifted with the vertically pivotable lifting members by the drive system.

The present invention also provides methods for lifting an industrial or agricultural spool for transport. The spool has a center hole with openings on opposite ends of the center hole. A specific exemplary embodiment of a method incudes the step of providing an apparatus mountable on a truck or trailer bed. The apparatus includes a pair of vertically pivotable lifting members, each one of the pair of lifting members having a distal end. A pair of lifting pins are mounted to the distal end of a corresponding lifting member. At least one drive system is operably connected to the pair of vertically pivotable lifting members. The apparatus is positioned near a spool such that the pair of lifting pins are disposed near the openings at the opposite ends of the spool center hole. The lifting pins are inserted into the openings of the center hole of the spool and the spool is lifted with the vertically pivotable lifting members. The pair of lifting pins engage the hole of the spool and the spool is lifted with the vertically pivotable lifting members by one of the at least one drive systems.

Alternative exemplary embodiments of the method include an apparatus having one or more safety pins and each of the pair of lifting pins has a hole to receive a safety pin. The method includes the step of inserting at least one of the one or more safety pins into the hole of at least one of the pair of lifting pins.

Yet another specific embodiment of the method provides an apparatus having at last one tire drive. The method includes the step of using one of the at least one tire drives to position the apparatus near a spool and engaging the spool such that the pair of lifting pins are disposed near the openings at the ends of the spool center hole.

Alternative embodiments of the present apparatus and methods provide that the spool is lifted to, or deployed from, an arm that is mounted in a truck or trailer bed.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION

The following discussion is directed to various embodiments of the invention. The term "invention" is not intended to refer to any particular embodiment or otherwise limit the scope of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In the following discussion and in the claims, the terms "including" and "comprising" are used in an open-ended fashion, and thus should be interpreted to mean "including, but not limited to." Also, the term "connect" or "connected" where used if at all is intended to mean either an indirect or direct connection. Thus, if a first component connects to a second component, that connection may be through a direct connection or through an indirect connection via other components and connections.

Certain terms are used throughout the following description and claims to refer to particular system components and method steps. As one skilled in the art will appreciate, different companies may refer to a component by different names. This document does not intend to distinguish between components that differ in name but not function.

Figure 1:
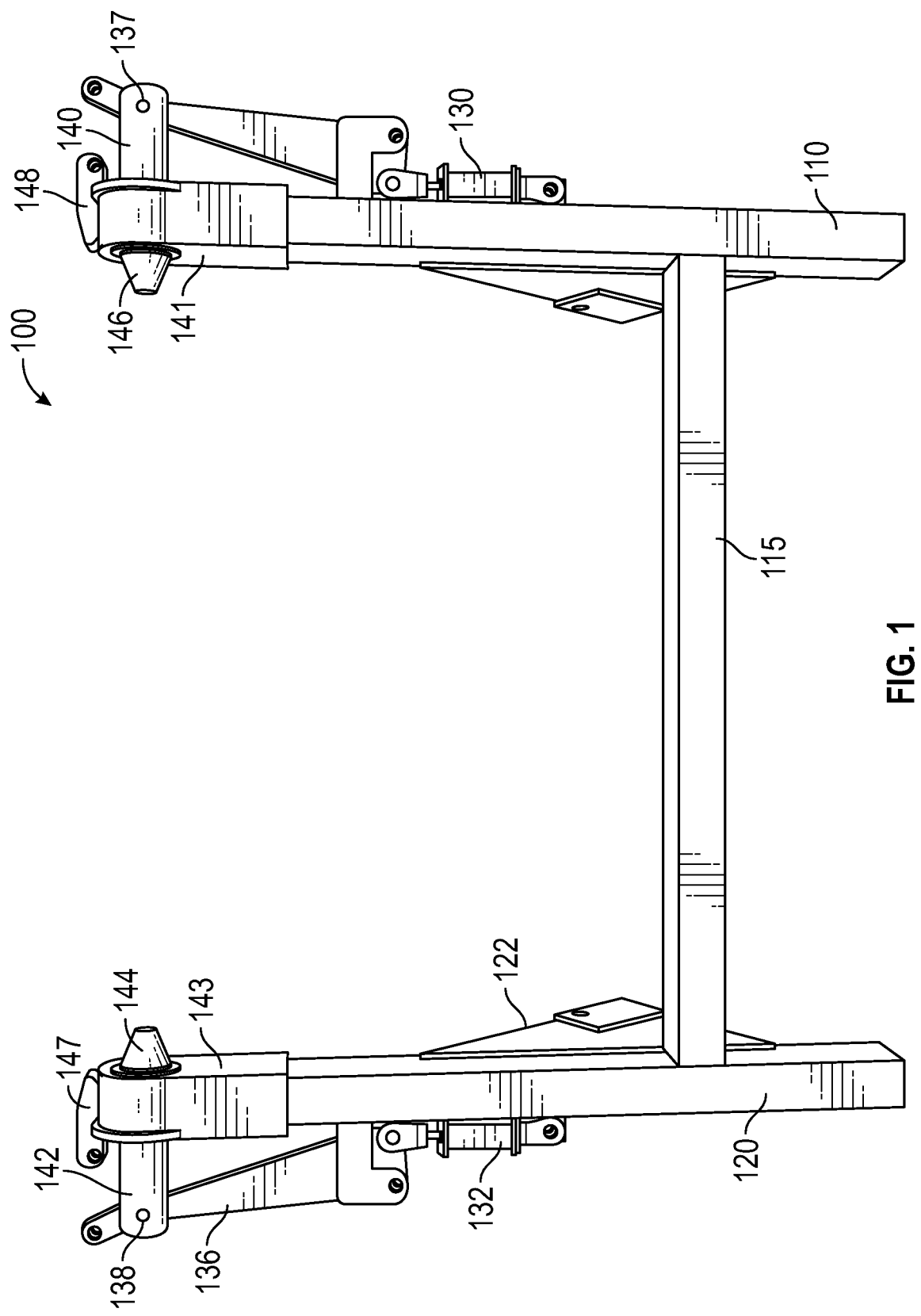
FIG. 1 is a rear perspective view of an exemplary embodiment of a spool lifting frame of the present invention.

FIG. 1 is a rear perspective view of an exemplary embodiment of a spool lifting frame of the present invention. Referring to FIG. 1 of the drawings, the reference numeral 100 generally designates a frame for a spool lifting apparatus embodying features of the present disclosure. The system 100 includes vertical members 110/120 connected by crossbar member 115. Vertical members 110/120 may be selectively lowered and raised pivotally by an operator. Stabilizer triangular plates 122 are mounted on the rear sides of vertical members 110 and 120, respectively. Pressure cylinders 130 and 132 are mounted on the exterior sides of vertical members 110 and 120, respectively. Cylinders 130/132 selectively interact with pivoting arms 136 which are pivotally connected to bushings 140/142, respectively, with safety pins 137/138, respectively. Brackets 147/148 reinforce attachment of bushings 140/142 to apparatus 100.

Lifting pins 146/144 have bearings (not shown) are selectively disposed into and out of bushings 140/142, respectively. Bushings 140/142 are mounted on the tops of lifting arms 110/120, respectively, with bushing housings 141/143, respectively. Operationally, after vertical members 110/120 have been lowered to meet a spool (not shown), liftin pins 146/144 selectively insert into the hole of the spool by operation of cylinders 130/132. With pins 146/144 in the spool hole, vertical members 110/120 are selectively raised to lift the spool into the tractor bed.

By reverse operation, a spool maybe be deposited at a site by lifting the spool out of the trailer bed by engaging the lifting pins 144/146 in the spool hole and lowering vertical members 110/120 to lift the spool out of the trailer bed and depositing the spool on the ground at the selected site.

Figure 2:
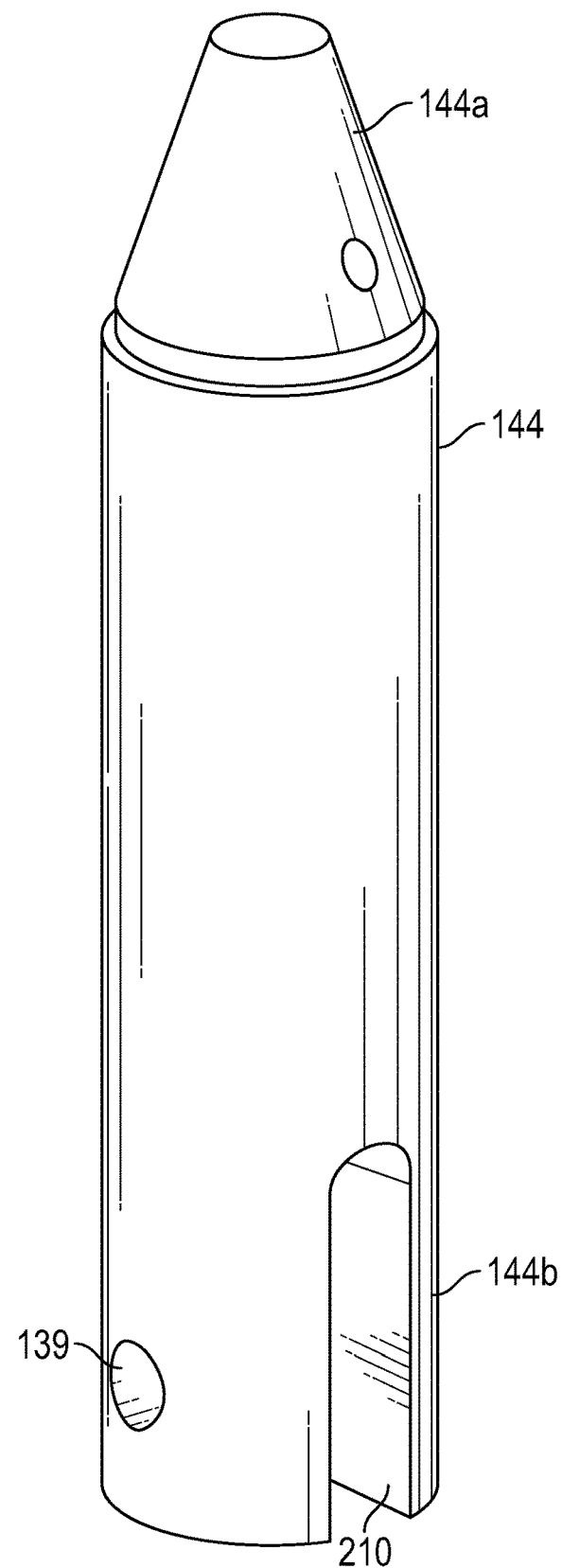
FIG. 2 is a side perspective view of a pin of an exemplary embodiment of a lifting frame of the present invention.

FIG. 2 is a side perspective view of a pin of an exemplary embodiment of a lifting frame of the present invention. Liftin pin 144 has a top portion characterized by a tapered end 144a and a bottom portion 144b characterized by slot 210 which receives pivoting arm 136 which is secured in place with safety pin 138 through bushing pin hole 139. Likewise, on the other side with respect to lifting pin 146 and safety pin 137.

Figure 3:
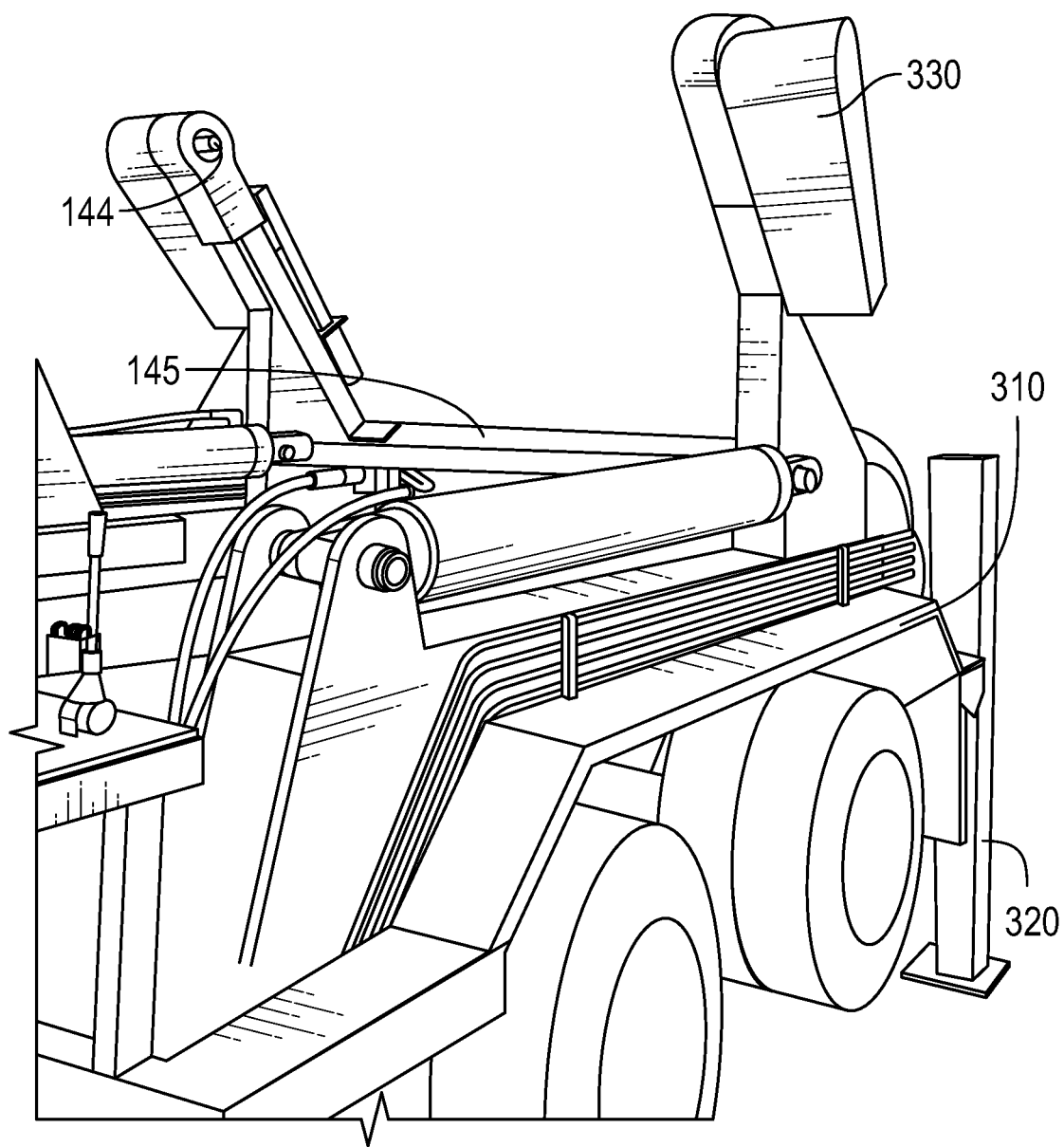
FIG. 3 is an oblique front perspective view of an exemplary embodiment of a lifting apparatus of the present invention mounted on the bed of a tractor.

FIG. 3 is an oblique front perspective view of an exemplary embodiment of a lifting apparatus of the present invention mounted on the bed of a tractor 310. The exemplary embodiment of FIG. 3 provides stabilizing post 320 mounted to the rear of truck 310 and housing 330 to protect pivoting arms 136, bushings 140/142, and lifting pins 146/144. The tapered end of lifting pin 144 extends out of housing 330 and bushing 142 (not seen).

Figure 4:
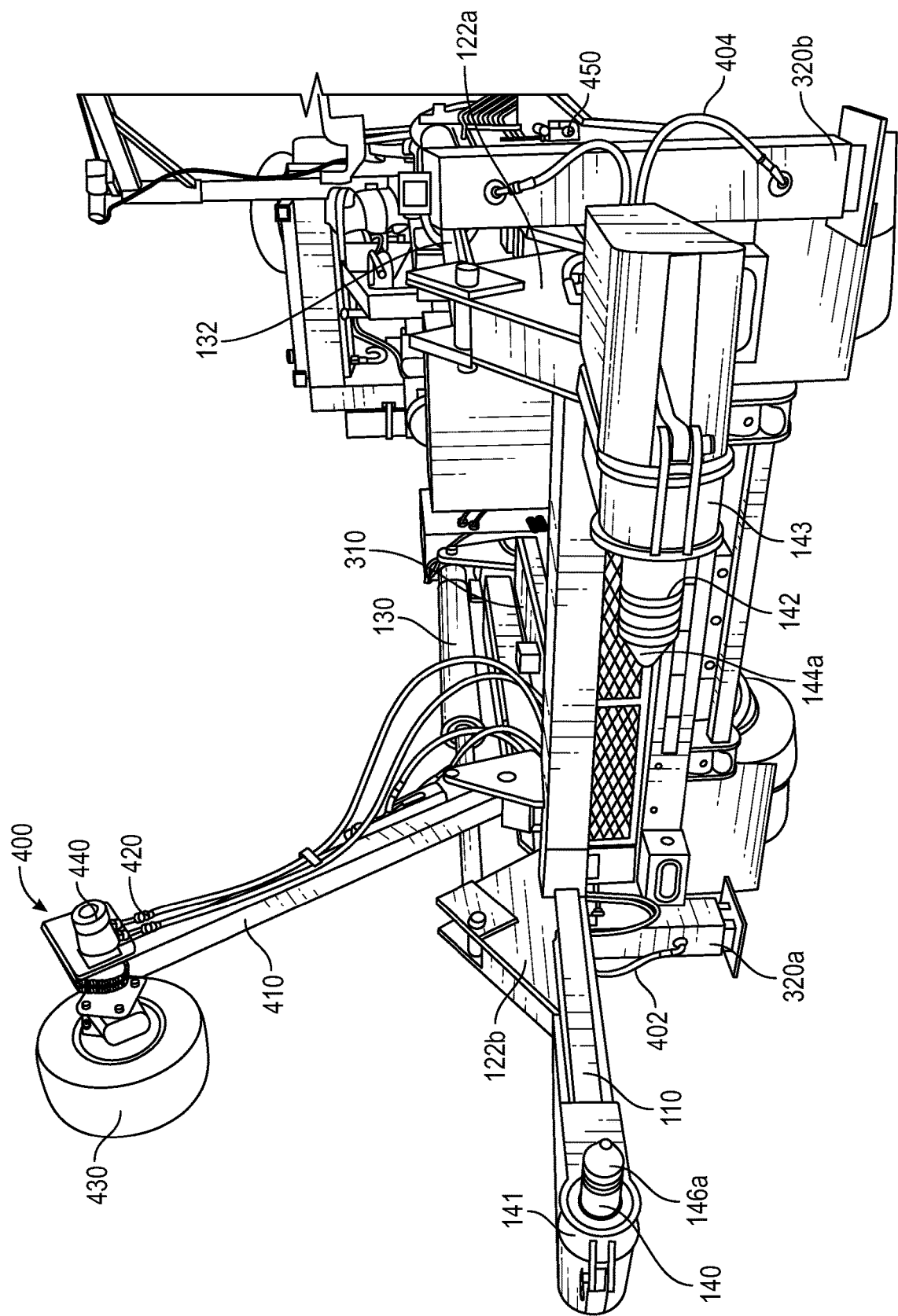
FIG. 4 is a rear oblique perspective view of an alternative embodiment of a lifting apparatus of the present invention with a tire drive.

FIG. 4 is a rear oblique perspective view of an alternative embodiment of a lifting apparatus of the present invention with a tire drive. Vertical members 110/120 and crossbar member 115 are lowered from position depicted in FIG. 1 to capture a spool (not shown). Stabilizer posts 320a/320b are attached to truck 310. Stabilizer posts 320a/320b are selectively controllable by pressure conduits 402/404, respectively, to be lowered to the ground to stabilize tractor 310 and to be raised off the ground for driving the truck. Pins 144/146 are disposed in bushings 140/142, respectively. Triangular stabilizers 122a/122b are mounted to vertical members 120/110, respectively, and operationally connected to pressure cylinders 130/132, respectively. The tapered ends 144a and 146a of lifting pins 144/146 extend out of bushings 140/142, respectively. Bushings 140/142 are mounted to lifting arms 110/120 by bushing housings 141/143, respectively. The above described configuration is substantially the same as that describe for FIG. 1, but in a horizontal rather than vertical posture.

Also mounted to tractor 310 is tire drive assembly 400. Pivotal cantilever arm 410 is operationally connected to a pressure drive system 420 which allows cantilever arm 410 to be pivotally lower or raised. At a distal end of cantilever arm 410 is tire 430 rotationally pivotally connected to a tire drive motor assembly 440. Disposed on a side of tractor 310 is a control panel 450 to which the pressure cylinders and pressure drives 130/132/440/402/404, for example, of the system are operationally connected to provide manual operator controls for operation of the spool lifting and tire drive assemblies, and stabilizer posts.

In operation, truck 310 is backed up to a spool (not shown) so that the horizontal hole of the spool approximately aligns with pins 144/146. Tire 430 is lowered by pressure drive 440 so that the tire makes enough frictional contact with the spool to allow an operator to fine tune the position of the spool hole relative to pins 144/146. When the hole aligns with the pins, the pins are extended into the hole and secured in position. Arms 110/120 are elevated by operation of pressure cylinders 130/132, thereby lifting the spool for transport to a different location. The spool can be deposited at another location by reversing the above described transport procedure.

Industrial cable spools or agricultural poly reels are very large, taller than a man, and heavy, weighing hundreds of pounds. These spools must be transported to locations where cable or poly will be laid or from locations were cable or poly has been pulled. Spools are typically transported by a truck pulling a trailer with a bed or by a tractor with a bed that can accommodate the spool. Lifting a large heavy spool off the ground and into a tractor bed or deploying a spool out of a tractor bed onto the ground is a potentially dangerous operation for human workers at a job site. The present invention provides an apparatus that can be installed on any suitable tractor or trailer bed and which substantially automates the lifting and deploying of spools for easier and safer worksite operations.

Many modifications and other embodiments of the spool lifter apparatus and methods described herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus mountable on a truck or trailer bed for lifting industrial or agricultural spools for transport, the apparatus comprising:
   a first vertically pivotable lifting member having a first distal end;
   a second vertically pivotable lifting member spaced from the first lifting member and having a second distal end;

a first lifting pin mounted to the first lifting member adjacent the first distal end and translatable relative to the first lifting member;

a second lifting pin mounted to the second lifting member adjacent the second distal end and translatable relative to the second lifting member;

a first actuator coupled to the first lifting pin and configured to move the first lifting pin relative to the first lifting member to selectively engage and disengage the spool;

a second actuator coupled to the second lifting pin and configured to move the second lifting pin relative to the second lifting member to selectively engage and disengage the spool; and a drive system operably connected to the first and second vertically pivotable lifting members to selectively and dependently raise and lower the first and second lifting members independent of movement of the first and second pins.

2. The apparatus of claim 1, wherein each of the first and second lifting pins further comprises a tapered end.

3. The apparatus of claim 1, wherein each of the first and second lifting pins further comprise bearings.

4. The apparatus of claim 1, further comprising a pair of safety pins, wherein each of the first and second lifting pins further comprises a hole to receive one of the pair of safety pins.

5. The apparatus of claim 1 further comprising a first bushing coupled to the first distal end, and a second bushing coupled to the second distal end, wherein the first lifting pin is disposed in the first bushing and the second lifting pin is disposed in the second bushing.

6. The apparatus of claim 5, further comprising a first bushing housing mounted on the first lifting member to house the first bushing, and a second bushing housing mounted on the second lifting member to house the second bushing.

7. The apparatus of claim 1, wherein the drive system includes one or more pressure cylinders operably connected to the first and second lifting members.

8. The apparatus of claim 1, further comprising one or more stabilizer members connected to the apparatus.

9. The apparatus of claim 1, further comprising at least one control panel operably connected to the drive system to raise and lower the first and second lifting members.

10. The apparatus of claim 1, further comprising at least one selectively positionable tire drive mounted on the apparatus to facilitate alignment of the first and second lifting pins with the spool.

11. The apparatus of claim 10, further comprising at least one control panel to facilitate selective positioning of the at least one tire drive.

12. The apparatus of claim 1, wherein the first actuator and the second actuator are cooperatively operable to dependently translate the first and second pins to engage and disengage the spool.

13. The apparatus of claim 12, wherein the first actuator and the second actuator are operable independent of the drive system.

14. The apparatus of claim 1, wherein the first and second lifting pins are slidable relative to the first and second lifting members to engage the spool after alignment of the first and second lifting pins with a hole in the spool.

15. The apparatus of claim 1, wherein the first actuator includes a first cylinder and a first pivoting arm coupled to the first lifting pin to move the first lifting pin relative to the first lifting member, and wherein the second actuator includes a second cylinder and a second pivoting arm coupled to the second lifting pin to move the second lifting pin relative to the second lifting member.

16. A method for maneuvering an industrial or agricultural spool for transport using an apparatus, the method comprising:

positioning a first vertically pivotable lifting member and a second vertically pivotable lifting member adjacent a spool, the first lifting member having a first lifting pin translatable relative to the first lifting member and the second lifting member having a second pin translatable relative to the second lifting member, and the first and second lifting members spaced from each other;

aligning the first lifting pin and the second lifting pin with the spool on opposite sides of the spool;

translating the first and second lifting pins relative to the first and second lifting members via respective actuators operably coupled to the first and second lifting pins to engage the first and second lifting pins with the spool; and lifting the spool with the first and second lifting members independent of movement of the first and second lifting pins via a drive system operably coupled to the first and second lifting members.

17. The method of claim 16, further comprising inserting a safety pin through each of the first lifting pin and the second lifting pin to secure the first and second lifting pins to the first and second lifting members, respectively.

18. The method of claim 16, further comprising aligning the first and second lifting pins with one or more openings in the spool using a tire drive that positions the apparatus adjacent the spool.

19. The method of claim 16, further comprising:

lowering the spool with the first and second lifting members via the drive system; and disengaging the first and second lifting pins via the respective actuators after the spool has been lowered.

20. The method of claim 16, wherein moving the first and second pins relative to the first and second sliding members includes sliding the first and second lifting pins relative to the first and second lifting members to engage the spool after the first and second pins are aligned with a hole in the spool.

* * * * *